US008628113B2

(12) United States Patent
Tamura

(10) Patent No.: US 8,628,113 B2
(45) Date of Patent: Jan. 14, 2014

(54) SIDE IMPACT ABSORBING APPARATUS FOR VEHICLE

(75) Inventor: Yoichi Tamura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/546,095

(22) Filed: Jul. 11, 2012

(65) Prior Publication Data

US 2013/0015644 A1 Jan. 17, 2013

(30) Foreign Application Priority Data

Jul. 12, 2011 (JP) ................................. 2011-153460

(51) Int. Cl.
*B60R 21/16* (2006.01)
(52) U.S. Cl.
USPC ....................................................... 280/730.2
(58) Field of Classification Search
USPC ................. 280/730.2, 751; 296/146.5, 146.6, 296/146.7, 187.12
See application file for complete search history.

(56) References Cited

U.S. PATENT DOCUMENTS

| 5,277,441 A * | 1/1994 | Sinnhuber .................. 280/730.1 |
| 5,447,326 A * | 9/1995 | Laske et al. ................ 280/728.3 |
| 5,749,600 A | 5/1998 | Yamada et al. |
| 5,865,496 A * | 2/1999 | Odan et al. ................. 296/146.6 |
| 6,378,896 B1 * | 4/2002 | Sakakida et al. ........... 280/730.2 |
| 7,341,277 B2 * | 3/2008 | Huttsell et al. ................ 280/751 |
| 2007/0075529 A1 * | 4/2007 | Boegge et al. ............. 280/730.2 |

FOREIGN PATENT DOCUMENTS

| JP | 08-067140 A | 3/1996 |
| JP | 2005-138838 A | 6/2005 |
| JP | 2007-237901 A | 9/2007 |
| JP | 2009-173139 A | 8/2009 |
| JP | 2011-105116 A | 6/2011 |

* cited by examiner

*Primary Examiner* — Faye M. Fleming
(74) *Attorney, Agent, or Firm* — Gifford, Krass, Sprinkle, Anderson & Citkowski, P.C.

(57) ABSTRACT

A side impact absorbing apparatus for a vehicle includes an impact bar, an impact absorbing member that has a portion which overlaps the impact bar, and a side airbag. The impact absorbing member has a first portion to which a load is applied from the deployed side airbag, and a second portion which is a portion of the impact absorbing member other than the first portion. The first portion is smaller in thickness at least at a connection portion that is connected to the second portion than a portion of the second portion, which is connected to the first portion from below the first portion.

10 Claims, 9 Drawing Sheets

SIDE IMPACT ABSORBING APPARATUS FOR VEHICLE

CROSS REFERENCE TO RELATED APPLICATIONS

This application claims priority to Japanese Patent Application No. 2011-153460 filed on Jul. 12, 2011, which is incorporated herein by reference in its entirety including the specification, drawings and abstract.

BACKGROUND OF THE INVENTION

1. Field of the Invention

The invention relates generally to a side impact absorbing apparatus for a vehicle, and more specifically to a side impact absorbing apparatus that reduces a load that is applied to the hip of an occupant from a side airbag at the latter-half stage of a vehicle side collision.

2. Description of Related Art

Japanese Patent Application Publication No. 2009-173139 describes a side impact absorbing apparatus in related art. In the side impact absorbing apparatus, impact bars are provided between an outer panel and an inner panel of a side door, a hip impact absorbing pad is provided between the inner panel and a door trim, and a side airbag unit is disposed at a position at which the side airbag unit does not overlap the impact bars when seen from the side of a vehicle.

With the above-described side impact absorbing apparatus, the hip of an occupant is restrained in the following manner when a side collision of the host vehicle with another vehicle occurs. A bumper of the other vehicle deforms the impact bars of the host vehicle toward the lateral center of a vehicle compartment. Then, the impact bars push the inner panel, the hip impact absorbing pad and the door trim toward the lateral center of the vehicle compartment. Thus, a load is applied to a side airbag deployed on the side of the hip of the occupant. In this way, the hip of the occupant is restrained.

However, the above-described side impact absorbing apparatus has the following problem. When a side collision occurs, a load is applied to the door trim via the hip impact absorbing pad and the entirety of the door trim is deflected toward the hip of the occupant. Therefore, it is not possible to reduce a load that is applied to the upper hip and the lower abdomen of the occupant from the side airbag at the latter-half stage of the side collision.

SUMMARY OF THE INVENTION

The invention provides a side impact absorbing apparatus that reduces a load that is applied to the hip of an occupant from a side airbag at the latter-half stage of a side collision.

An aspect of the invention relates to a side impact absorbing apparatus for a vehicle, which includes: an impact bar, an impact absorbing member, and a side airbag. The impact bar is disposed inside a side door so as to extend along an outer panel of the side door. The impact absorbing member is located outward of the hip and the lower abdomen of an occupant in the vehicle lateral direction, is disposed on the back side of a door trim of the side door, and has a portion which overlaps the impact bar when seen from a side of a host vehicle. The side airbag is deployed and inflated between the door trim and a side portion of the occupant when a side collision occurs. The impact absorbing member has i) a first portion which overlaps a lower portion of the deployed side airbag when seen from the side of the host vehicle, and to which a load from the deployed side airbag is applied, and ii) a second portion that is a portion of the impact absorbing member other than the first portion. The first portion has a connection portion that is connected to the second portion. The first portion is smaller in thickness at least at the connection portion that is connected to the second portion than a portion of the second portion, the portion being connected to the first portion from below the first portion. The side impact absorbing apparatus for a vehicle according to the aspect is applied to both first and second embodiments of the invention described later.

When a side collision of the host vehicle with another vehicle occurs, the side airbag is deployed between the side portion of the occupant and the door trim in the side impact absorbing apparatus for a vehicle according to the above aspect. A bumper of the other vehicle hits the side door and the impact bar inside the side door is pushed and deformed inward in the vehicle lateral direction, and the door trim is pushed inward in the vehicle lateral direction via the impact absorbing member on the back side of the door trim. Thus, a load is applied to the side airbag deployed on the side of the hip and the lower abdomen of the occupant, and thus the hip of the occupant is restrained. When the bumper of the other vehicle further moves inward, a load that is applied to the hip and the lower abdomen of the occupant via the door trim and the side airbag is further increased. At this time, the side airbag applies a reaction force from the hip and the lower abdomen of the occupant to the impact absorbing member via the door trim. The first portion is smaller in thickness at least at the connection portion that is connected to the second portion than a portion of the second portion, the portion being connected to the first portion from below the first portion. Therefore, as the load applied from the side airbag to the first portion via the door trim increases with an inward movement of the bumper, the first portion is deformed so as to topple outward in the vehicle lateral direction with respect to the second portion. Then, if the load further increases, the connection portion breaks. When the first portion is deformed or broken outward in the vehicle lateral direction, a portion of the door trim, which is located inward of the first portion, is deflected outward in the vehicle lateral direction. Thus, the load that is applied to the ilium upper portion and the lower abdomen of the occupant is reduced. As a result, it is possible to reduce damage to the occupant.

In the side impact absorbing apparatus for a vehicle according to the above aspect, the impact absorbing member may have a projection at least at a part of the portion of the impact absorbing member, the portion overlapping the impact bar when seen from the side of the host vehicle, and the projection may be fitted in a hole formed in an inner panel and project toward the impact bar. The thus configured side impact absorbing apparatus for a vehicle is applied to both the first and second embodiments of the invention.

In the thus configured side impact absorbing apparatus for a vehicle, because the impact absorbing member has the projection that projects toward the impact bar and the projection is fitted in the hole formed in the inner panel, the clearance between the distal end of the projection and the impact bar is less than the clearance in a case where there is no projection. As a result, in the event of a side collision, the time at which the impact bar hits the projection of the impact absorbing member is earlier than the time at which the impact bar hits the impact absorbing member with no projection. Due to this, the door trim is pushed inward in the vehicle lateral direction more promptly, and the hip of the occupant is restrained by the deployed side airbag more promptly.

In the side impact absorbing apparatus for a vehicle configured as described above, the first portion of the impact absorbing member may be formed at a portion of the impact absorbing member, the portion being located outward of the ilium tipper portion and the lower abdomen of a seated small occupant in the vehicle lateral direction. A body size of the small occupant may be a body size that corresponds to AF05 dummy. The thus configured side impact absorbing apparatus for a vehicle is applied to both the first and second embodiments of the invention.

In the thus configured side impact absorbing apparatus for a vehicle, the first portion of the impact absorbing member is located at the portion of the impact absorbing member, the portion being located outward of the ilium upper portion and the lower abdomen of the seated small occupant in the vehicle lateral direction. Therefore, it is possible to effectively protect the small occupant who is less resistant to a vehicle collision than a large occupant.

In the thus configured side impact absorbing apparatus for a vehicle, the impact absorbing member may have a front slit and a rear slit which are formed at a position forward of the first portion and a position rearward of the first portion, respectively, in the vehicle longitudinal direction, and each of which extends from the upper end of the impact absorbing member to a position corresponding to the lower end of the first portion or to a position below the lower end of the first portion when seen from the side of the host vehicle. The first portion may be smaller in thickness at least at the connection portion than the portion of the second portion, the portion being connected to the first portion from below the first portion, over the whole length between the front slit and the rear slit in the vehicle longitudinal direction. The thus configured side impact absorbing apparatus for a vehicle is applied to both the first and second embodiments of the invention.

In the thus configured side impact absorbing apparatus for a vehicle, because the impact absorbing member has the front slit and the rear slit which are formed at the position forward of the first portion and the position rearward of the first portion, respectively, in the vehicle longitudinal direction when seen from the side of the host vehicle, the first portion is reliably located between the front slit and the rear slit. Therefore, the first portion is reliably broken without being influenced by the second portion.

In the thus configured side impact absorbing apparatus for a vehicle, the projection may be formed at a position forward of the first portion of the impact absorbing member in the vehicle longitudinal direction. The thus configured side impact absorbing apparatus for a vehicle is applied to both the first and second embodiments of the invention.

In the thus configured side impact absorbing apparatus for a vehicle, because the projection is formed at the position forward of the first portion of the impact absorbing member in the vehicle longitudinal direction, the position of the projection is close to a longitudinally middle portion of the impact bar, at which the deformation of the impact bar is largest when a side collision occurs. Accordingly, the projection is pushed by the impact bar at a portion at which deformation of the impact bar is largest, or at a portion close to the portion at which the deformation of the impact bar is largest.

In the thus configured side impact absorbing apparatus for a vehicle, on a graph in which the ordinate axis represents a load that is applied from the side airbag to the hip and the lower abdomen of the occupant and the abscissa axis represents a stroke of a bumper of another vehicle with respect to the hip of the occupant, a first curve indicates a load-stroke characteristic of the impact absorbing member that has the projection and the first portion and a second curve indicates a load-stroke characteristic of an impact absorbing member that has neither the projection nor the first portion, and a thickness of the first portion at least at the connection portion, a height of the first portion, and an amount by which the projection projects from the second portion in the vehicle lateral direction may be set such that the following conditions i) to v) are satisfied. i) The first curve has a first region in which the load increases at a first gradient, and a second region in which the load increases up to a load peak value at a second gradient that is lower than the first gradient. ii) The first curve has an intersection at which the first curve intersects with the second curve in the second region. iii) The intersection is located in a middle portion of the second region of the first curve. iv) In a region in which the load is lower than the load at the intersection, when the same load is applied to each of the impact absorbing members, the stroke indicated by the first curve is smaller than the stroke indicated by the second curve. v) In a region in which the load is higher than the load at the intersection and which extends up to the load peak value of the first curve, at the same stroke, the load indicated by the first curve is lower than the load indicated by the second curve. The thus configured side impact absorbing apparatus for a vehicle is applied to both the first and second embodiments of the invention.

In the thus configured side impact absorbing apparatus for a vehicle, because the intersection of the first curve with the second curve is set in the middle portion of the second region of the first curve, it is possible to maintain the energy absorption effect produced by the impact absorbing member at substantially the same level as the energy absorption effect produced by the impact absorbing member in a comparative example. Therefore, it is possible to more promptly restrain the hip of the occupant due to formation of the projection, and it is possible to reduce a load that is applied to the hip and the lower abdomen of the occupant due to formation of the first portion, with almost no increase in impact energy. As a result, it is possible to reduce damage to the occupant.

In the thus configured side impact absorbing apparatus for a vehicle, a width of the front slit in the vehicle longitudinal direction may be larger than a width of the rear slit in the vehicle longitudinal direction. The front slit serves as a space for suppressing application of a load from a pole to the occupant when a collision between the host vehicle and the pole occurs. The thus configured side impact absorbing apparatus for a vehicle is applied to the second embodiment of the invention.

In the thus configured impact absorbing apparatus for a vehicle, the width of the front slit in the vehicle longitudinal direction is larger than the width of the rear slit in the vehicle longitudinal direction. Therefore, when a collision between the host vehicle and the pole occurs, it is possible to suppress application of a load from the pole to the occupant who is moved forward on a seat. Therefore, it is possible to take measures against a side collision and a collision with a pole just by making the width of the front slit in the first portion larger.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 9:
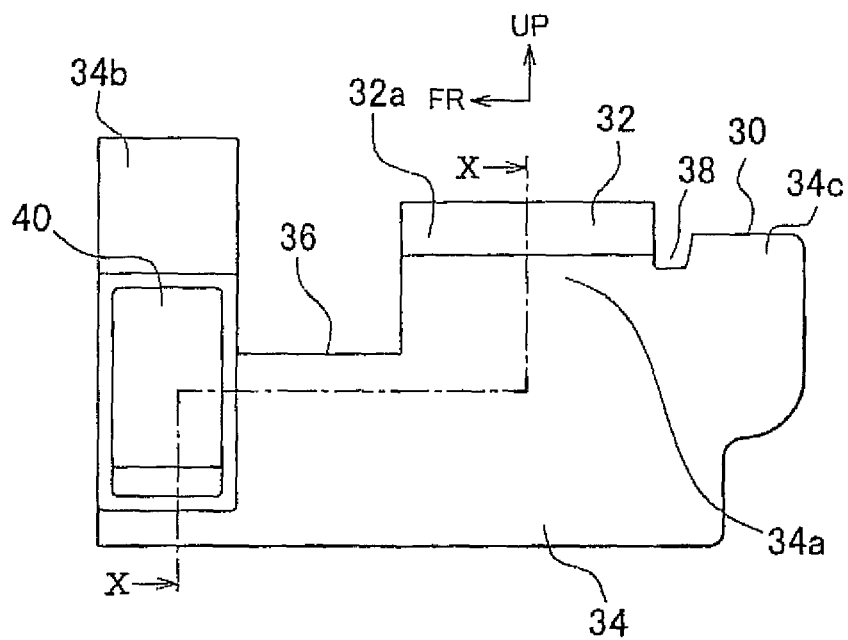
FIG. 9 is a side view showing the impact absorbing member of the side impact absorbing apparatus for a vehicle according to the second embodiment of the invention when seen from the side of the vehicle.
Figure 10:
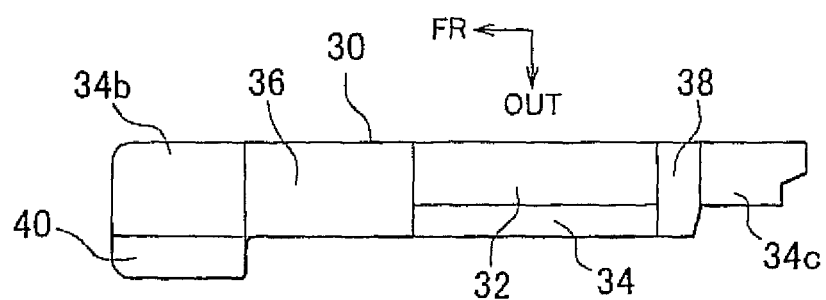
FIG. 10 is a plan view showing the impact absorbing member in FIG. 9.
Figure 11:
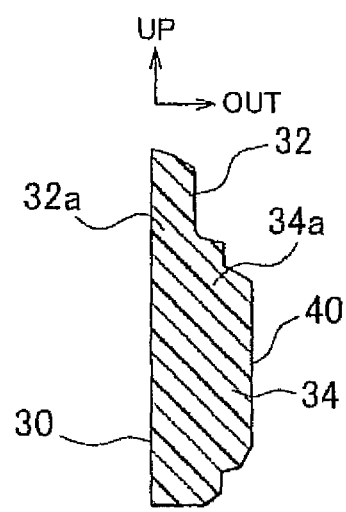
FIG. 11 is a sectional view taken along the line X-X in FIG. 9.
Figure 12:
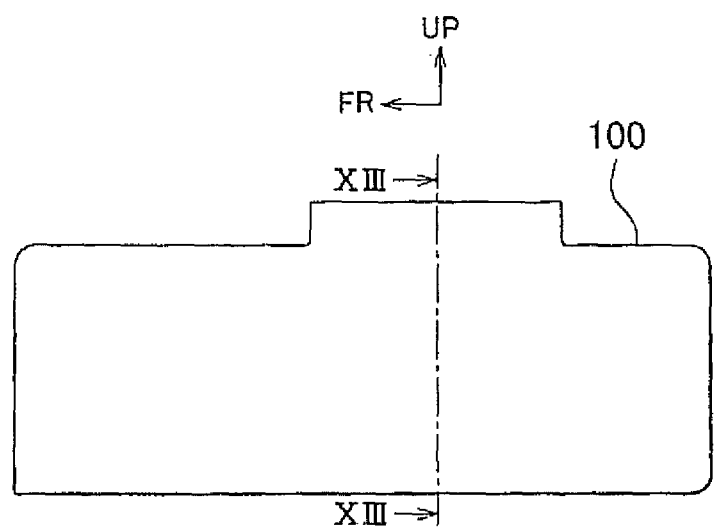
FIG. 12 is a side view showing an impact absorbing member in a comparative example when seen from the side of the vehicle.
Figure 13:
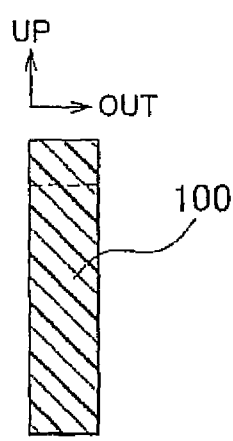
FIG. 13 is a sectional view taken along the line XIII-XIII in FIG. 12.

A side impact absorbing apparatus for a vehicle according to embodiments of the invention will be described with reference to FIG. 1 to FIG. 11 and FIG. 14. FIG. 1 to FIG. 8 illustrate a first embodiment of the invention, and FIG. 9 to FIG. 11 illustrate a second embodiment of the invention. FIG. 12 and FIG. 13 are drawings showing an impact absorbing member in a comparative example. Note that the impact absorbing member in the comparative example is not limited to a conventionally known impact absorbing member. The components that are employed in both the first and second embodiments will be denoted by the same reference numerals in both the first and second embodiments. In the drawings, FR indicates the direction toward the front of a vehicle in the vehicle longitudinal direction, OUT indicates the direction toward the outside of the vehicle in the vehicle lateral direction, and UP indicates the direction toward the top of the vehicle in the vehicle-height direction. The drawings show an example in which the invention is applied to a left-hand drive vehicle. However, the invention may be applied to a right-hand drive vehicle if the configurations in FIG. 2 to FIG. 4 and FIG. 6 to FIG. 8 are reversed in the vehicle lateral direction. In other words, the side impact absorbing apparatus for a vehicle according to the invention is applicable to both a left-hand drive vehicle and a right-hand drive vehicle.

Figure 1:
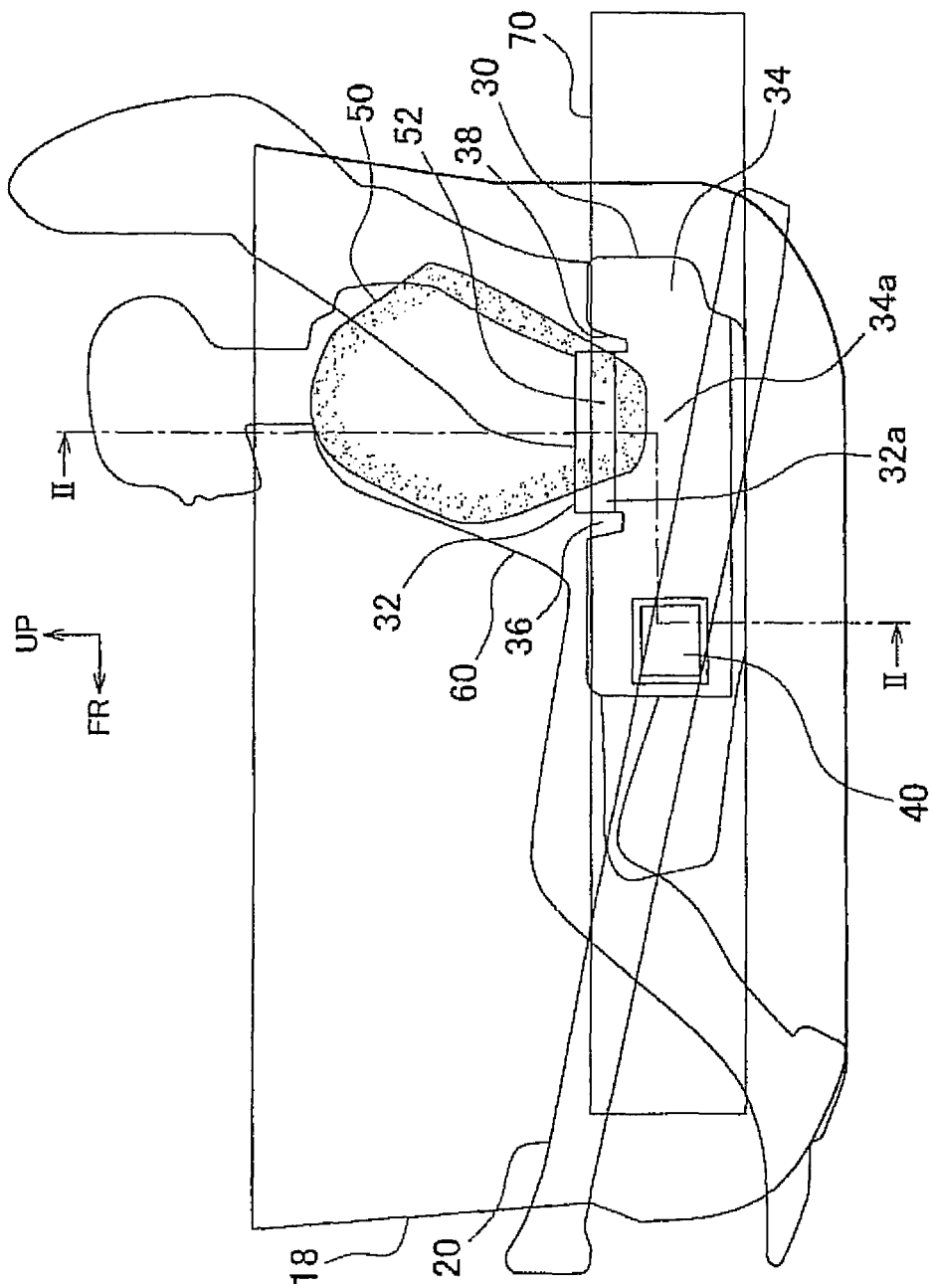
FIG. 1 is a perspective side view showing a side impact absorbing apparatus for a vehicle according to a first embodiment of the invention, and also showing the configuration of a side impact absorbing apparatus for a vehicle according to a second embodiment of the invention other than a front slit.
Figure 2:
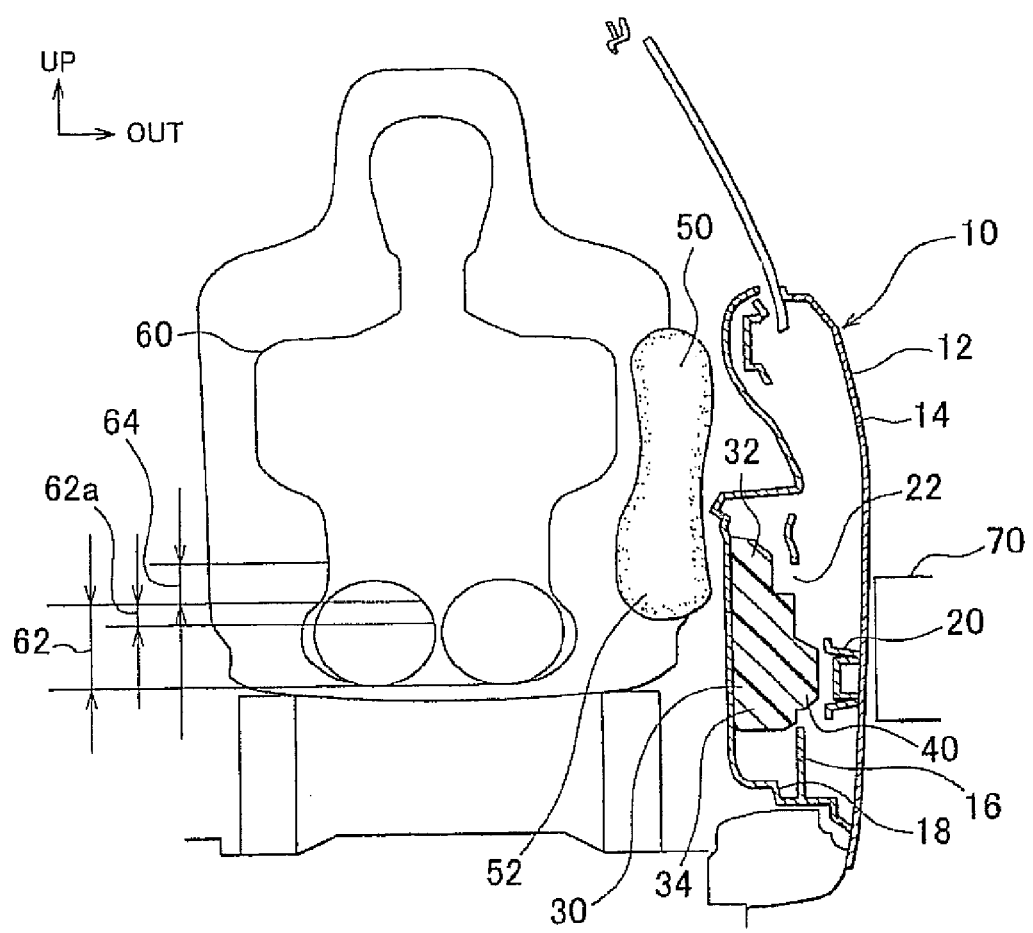
FIG. 2 is a sectional view taken along the line in FIG. 1, showing the state of the host vehicle before a bumper of another vehicle collides with a side door of the host vehicle.
Figure 4:
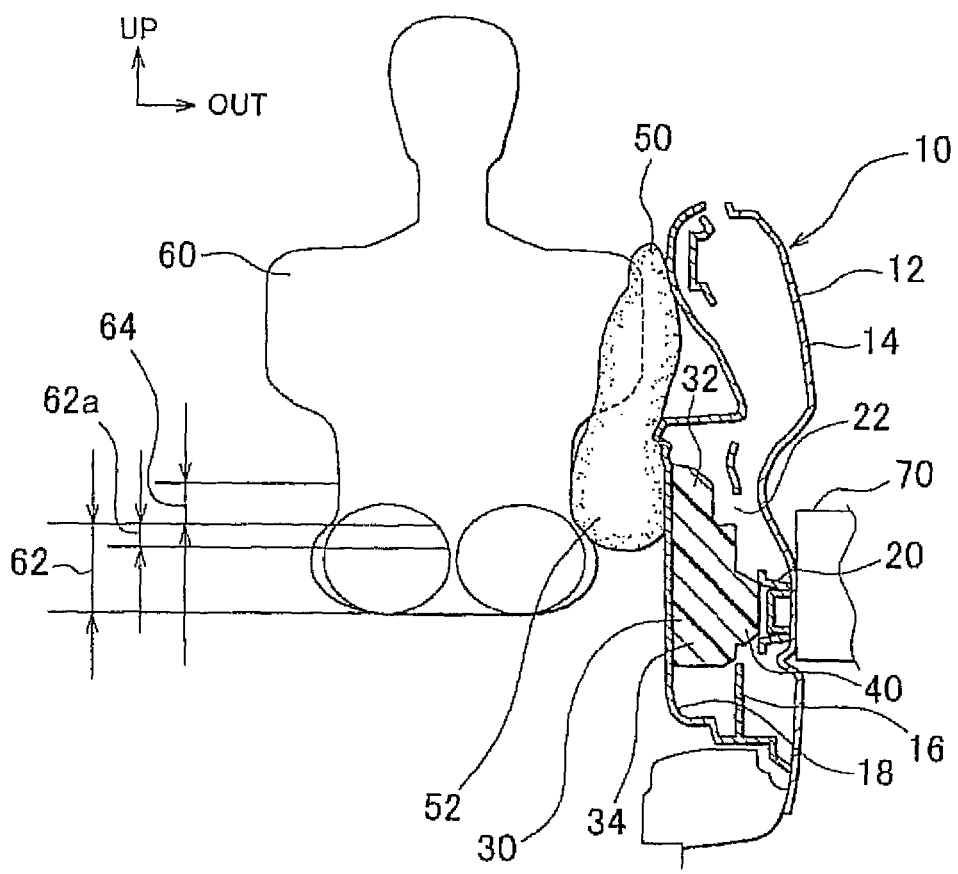
FIG. 4 is a sectional view corresponding to FIG. 2, showing the state after the bumper of the other vehicle collides with the side door and the first portion breaks.
Figure 5:
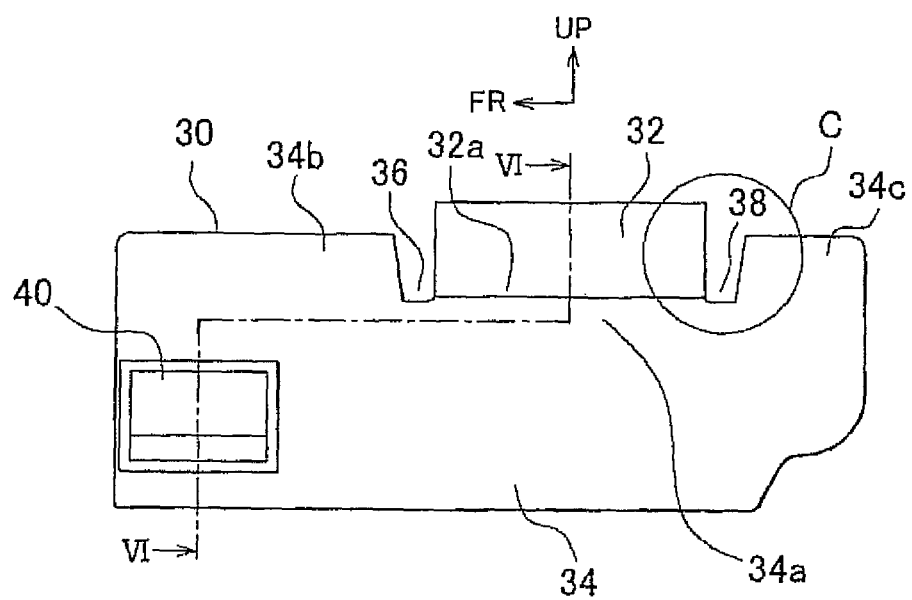
FIG. 5 is a side view showing an impact absorbing member of the side impact absorbing apparatus for a vehicle according to the first embodiment of the invention, and also showing an impact absorbing member according to the second embodiment of the invention other than a front slit, when the impact absorbing member is seen from the side of the vehicle.
Figure 6:
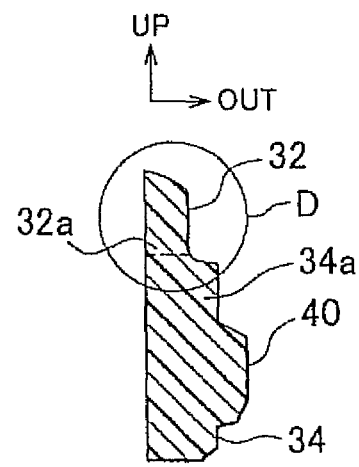
FIG. 6 is a sectional view taken along the line VI-VI in FIG. 5.
Figure 7:
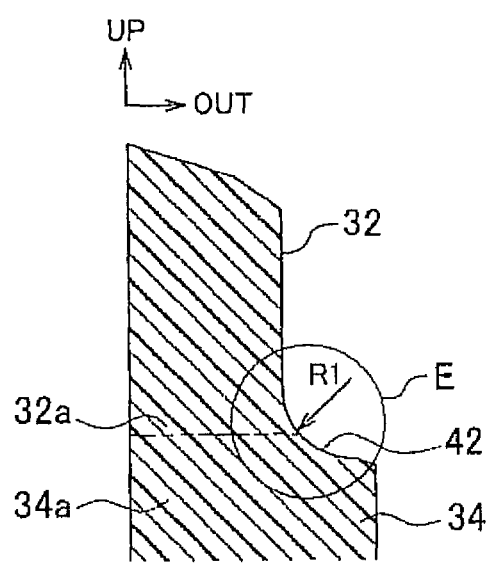
FIG. 7 is an enlarged sectional view of a portion D in FIG. 6.
Figure 8:
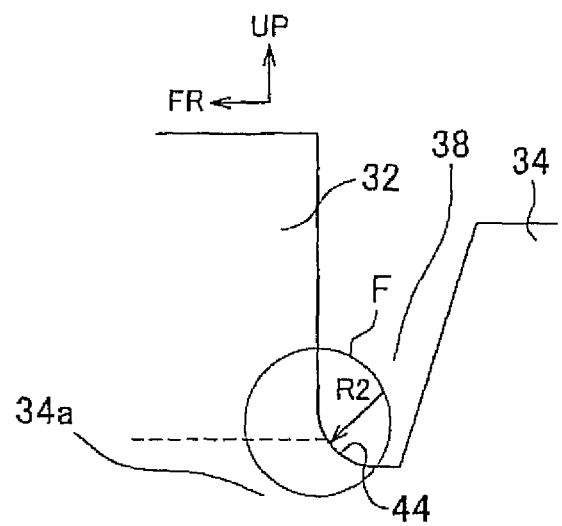
FIG. 8 is an enlarged sectional view of a portion C in FIG. 5.

First, a side impact absorbing apparatus 10 according to a first embodiment of the invention will be described with reference to FIG. 1 to FIG. 8 and FIG. 14. As shown in FIG. 1 and FIG. 2, the side impact absorbing apparatus 10 according to the first embodiment of the invention includes an impact bar 20, an impact absorbing member 30 for protecting the hip of an occupant, and a side airbag 50. The impact bar 20 is arranged to be slanted such that the front end thereof is at a position higher than the rear end thereof when seen from the side of a vehicle. The impact bar 20 is disposed inside a side door 12 so as to extend along an outer panel 14 of the side door 12. The impact absorbing member 30 is disposed at a position outward of a hip 62 and a lower abdomen 64 of an occupant 60 in the vehicle lateral direction, and on the back side of a door trim 18 of the side door 12. The impact absorbing member 30 has a portion that overlaps the impact bar 20 when seen from the side of the vehicle. The side airbag 50 is deployed and inflated between the door trim 18 and one side portion of the occupant 60 when a side collision occurs. The impact absorbing member 30 has a first portion 32 and a second portion 34. The first portion 32 overlaps a lower portion 52 of the deployed side airbag 50 when seen from the side of the vehicle. Therefore, a load from the deployed side airbag 50 is applied to the first portion 32. The second portion 34 is a portion of the impact absorbing member 30 other than the first portion 32, and does not overlap the lower portion 52 of the deployed side airbag 50 when seen from the side of the vehicle. As shown in FIG. 5 and FIG. 6, the first portion 32 has a connection portion 32a that is connected to the second portion 34. The thickness of the connection portion 32a of the first portion 32 is less than the thickness a portion 34a of the second portion 34, which is connected to the first portion 32 from below the first portion 32.

As shown in FIG. 1 and FIG. 2, the side door 12 includes the outer panel 14 made of metal, an inner panel 16 made of metal, and the door trim 18 made of resin. The inner panel 16 is disposed inward of the outer panel 14 in the vehicle lateral direction. The door trim 18 is disposed inward of the inner panel 16 in the vehicle lateral direction. The inner panel 16 is fixed to the outer panel 14. A clearance is formed between the outer panel 14 and the inner panel 16, and a clearance is formed between the inner panel 16 and the door trim 18.

As shown in FIG. 1 and FIG. 2, the impact bar 20 is disposed between the outer panel 14 and the inner panel 16 of the side door 12, and extends in the vehicle longitudinal direction. The impact bar 20 is connected at both longitudinal ends to the outer panel 14 of the side door 12. When a collision has not occurred, a clearance is left between a longitudinally middle portion of the impact bar 20 and the outer panel 14. The impact bar 20 is disposed in a region that covers the width of a bumper 70 of another vehicle in the vehicle height direction. The impact bar 20 is disposed at a position below the deployed side airbag 50, and extends in the vehicle longitudinal direction. The impact bar 20 may be made of a plate member that is recessed and projected in the vehicle lateral direction, at a cross-section orthogonal to the longitudinal direction of the impact bar 20. Alternatively, the impact bar 20 may be an assembly of a tubular impact beam and a plate member connected to the impact beam. FIG. 2 shows an example in which the impact bar 20 is made of a plate member.

As shown in FIG. 5 to FIG. 8, the impact absorbing member 30 is made of resin material or rubber material. For example, the impact absorbing member 30 is made of urethane. However, the material of the impact absorbing member 30 is not limited to urethane as long as the material is resin material or rubber material that is able to absorb an impact. As shown in FIG. 1 and FIG. 5, the impact absorbing member 30 is a member that is generally rectangular when seen from the side of the vehicle. The impact absorbing member 30 is fixed at multiple portions to the back side of the door trim 18 through, for example, thermal welding. The thickness of the thermally welded portions of the impact absorbing member 30 may be less than the thickness of the other portions. In addition, the outer side of the impact absorbing member 30 in the vehicle lateral direction may be covered with cloth or a flexible resin film (both are not shown) attached on the outer side. With this configuration, even if a portion of the impact absorbing member 30 is broken in the event of a side collision, the broken portion does not drop.

As shown in FIG. 1 and FIG. 2, the impact absorbing member 30 extends from a portion thereof that is located outward of the hip of a seated occupant in the vehicle lateral direction, toward the front and rear of the vehicle in the vehicle longitudinal direction, in addition, the impact absorbing member 30 extends, in the vehicle height direction, from a portion thereof that is located outward of the upper hip (the ilium upper portion) and the lower abdomen of the seated occupant in the vehicle lateral direction, to a portion thereof that is located outward of the lower end of the hip (buttocks) of the occupant in the vehicle lateral direction.

The impact absorbing member 30 has the first portion 32 located at a longitudinally middle portion of the impact absorbing member 30. The first portion 32 overlaps the lower portion of the deployed side airbag 50 when seen from the side of the vehicle. A reaction force from the lower portion 52 of the deployed side airbag 50 is applied to the first portion 32. The impact absorbing member 30 further has the second portion 34 that is a portion of the impact absorbing member 30 other than the first portion 32.

The impact absorbing member 30 has a front slit 36 formed at a position forward of the first portion 32 and a rear slit 38 formed at a position rearward of the first portion 32 in the vehicle longitudinal direction, when seen from the side of the vehicle. The front slit 36 and the rear slit 38 extend downward from the upper end of the impact absorbing member 30. The front slit 36 and the rear slit 38 do not reach the lower end of the impact absorbing member 30. The front slit 36 and the rear slit 38 extend to positions that correspond to the lower end of the first portion 32 or to positions below the lower end of the first portion 32. In the impact absorbing member 30, a front side portion 34b located forward of the front slit 36 and a rear side portion 34c located rearward of the rear slit 38 are included in the second portion 34.

As shown in FIG. 5 and FIG. 6, the first portion 32 of the impact absorbing member 30 extends over the whole distance between the front slit 36 and the rear slit 38 in the vehicle longitudinal direction. The front slit 36 and the rear slit 38 are formed to extend downward from the upper end of the impact absorbing member 30, and the depth of the rear slit 38 is less than the depth of the front slit 36. The first portion 32 of the impact absorbing member 30 extends to a position near the bottom of the rear slit 38 in the vehicle height direction. The first portion 32 of the impact absorbing member 30 is generally rectangular, and extends substantially horizontally in the vehicle longitudinal direction. The lower end of the first portion 32 is located at a position that corresponds to the lower end of the deployed side airbag 50 or a position slightly above the lower end of the deployed side airbag 50. A reaction force from the deployed side airbag 50 is applied to the first portion 32.

The first portion 32 of the impact absorbing member 30 is set to a portion of the impact absorbing member 30, which is located outward of an ilium upper portion 62a and the lower abdomen 62 of a seated small occupant in the vehicle lateral direction. Note that, "small occupant" means an occupant whose body size corresponds to, for example, AF05 dummy. Here, AF indicates a body size of an American woman. AF05 indicates a body size of 5, when the body size of the smallest American woman is 0, the body size of the largest American woman is 100, and the average body size of American women is 50.

The connection portion 32a is a portion of the first portion 32. The connection portion 32a extends over the whole distance between the front slit 36 and the rear slit 38 in the vehicle longitudinal direction. When the thickness of the first portion 32 is less than the thickness of the second portion 34, the entire region of the first portion 32 may be thinner than the portion 34a of the second portion 34, which is connected to the first portion 32 from below the first portion 32. Alternatively, only the connection portion 32a may be thinner than the portion 34a of the second portion 34, which is connected to the first portion 32 from below the first portion 32. FIG. 2 to FIG. 4 and FIG. 6 show an example in which the entire region of the first portion 32 is thinner than the portion 34a of the second portion 34, which is connected to the first portion 32 from below the first portion 32.

As shown in FIG. 1, FIG. 2, FIG. 5, and FIG. 6, the impact absorbing member 30 has a projection 40 that projects toward the impact bar 20. The projection 40 is formed at least at a part of the portion of the impact absorbing member 30, the portion overlapping the impact bar 20 when seen from the side of the vehicle. The projection 40 is fitted in a hole 22 (e.g. maintenance hole) formed in the inner panel 16. The projection 40 is a part of the impact absorbing member 30, and is formed integrally with the second portion 34. The hole 22 may be a hole other than a maintenance hole. Although not shown in the drawings, the maintenance hole is covered with a maintenance hole cover so that the maintenance hole is sealed. A portion of the maintenance hole cover, which corresponds to the projection 40, is formed so as to project outward in the vehicle lateral direction in accordance with the outer shape of the projection 40.

The distal end of the projection 40 faces the impact bar 20. A clearance is formed between the distal end of the projection 40 and the impact bar 20. The distance between the distal end of the projection 40 and the impact bar 20 is less than the distance between the impact bar 20 and a portion of the second portion 34 other than the projection 40. The inner panel 16 is not present between the distal end of the projection 40 and the impact bar 20. Therefore, if the impact bar 20 is pushed by the bumper 70 of the other vehicle and deformed in the event of a side collision, the projection 40 directly contacts the impact bar 20 before the portion of the second portion 34 other than the projection 40 contacts the impact bar 20, and then the projection 40 is pushed inward in the vehicle lateral direction.

The projection 40 need not overlap the lower portion 52 of the deployed side airbag 50 when seen from the side of the vehicle. The drawings show an example in which the projection 40 does not overlap the lower portion 52 of the deployed side airbag 50 when seen from the side of the vehicle. FIG. 1 and FIG. 5 show an example in which the shape of the distal end of the projection 40 is a rectangular shape when seen from the side of the vehicle. However, the shape of the distal end of the projection 40 is not limited to a rectangular shape, and may be, for example, a circular shape, an oval shape, and a rectangular shape with rounded corners.

In an example shown in the drawings, the projection 40 is formed in the second portion 34 of the impact absorbing member 30, at a portion forward of the portion 34a that is located immediately below the first portion 32. If the projection 40 is formed at a portion forward of the portion 34a of the second portion 34, the projection 40 is located near the longitudinally middle portion of the impact bar 20. When a side impact load is applied to the impact bar 20 from the bumper 70 of the other vehicle, a deformation amount of the longitudinally middle portion of the impact bar 20 is larger than a deformation amount of the remaining portion of the impact bar 20, and therefore the projection 40 is easily pushed by the impact bar 20.

Figure 14:
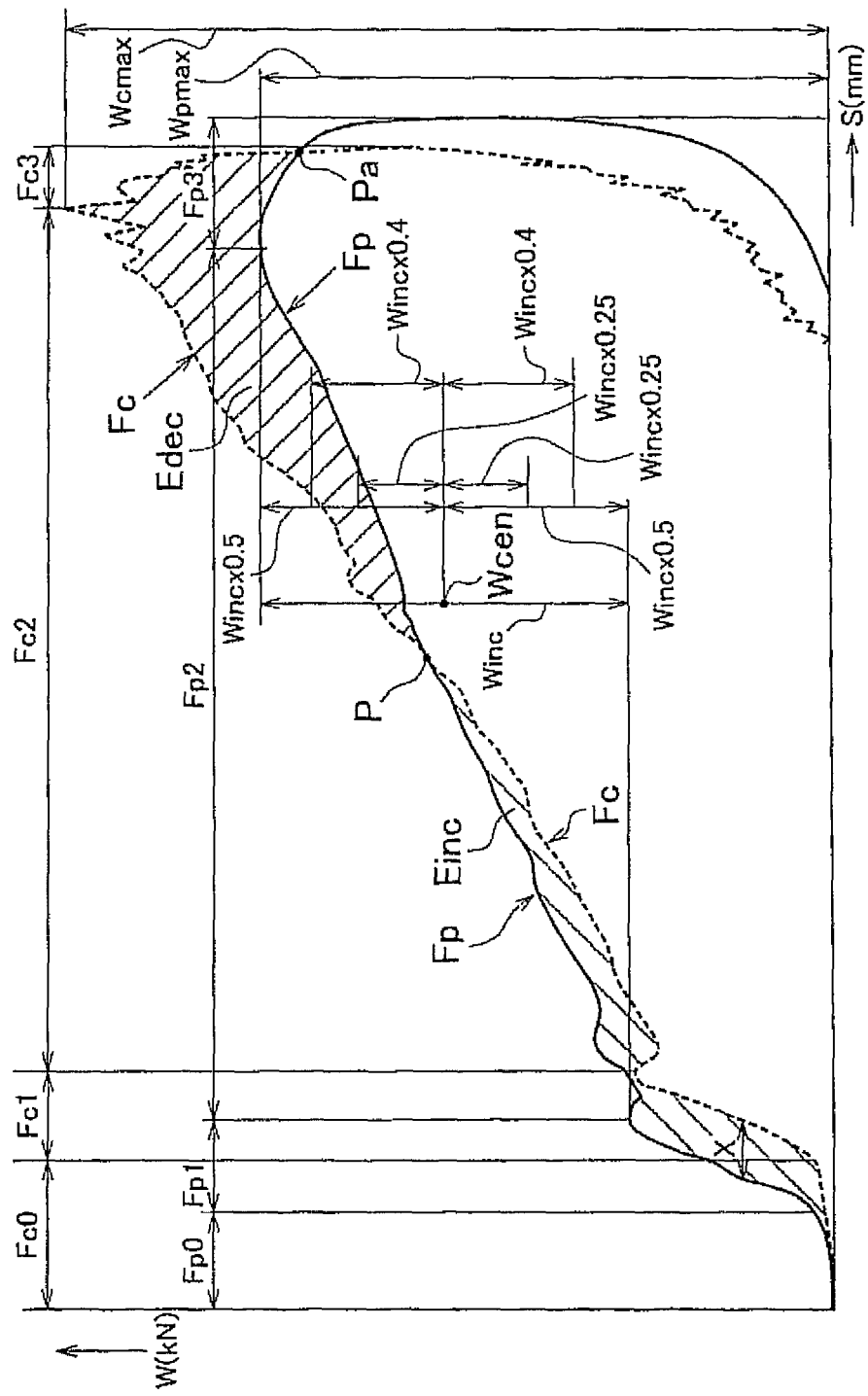
FIG. 14 is a graph that shows the load-stroke characteristic of the impact absorbing member with a projection and the first portion according to the embodiments of the invention and that of the impact absorbing member with no projection and first portion in the comparative example, where the ordinate axis represents a load that is applied from a side airbag to the hip and the lower abdomen of an occupant in the event of a side collision, and the abscissa axis represents a stroke of the bumper of the other vehicle with respect to the hip of the occupant.

FIG. 12 and FIG. 13 show an impact absorbing member 100 in a comparative example, which has neither the projection 40 nor the first portion 32. FIG. 14 is a graph that shows the load (W)-stroke (S) characteristic of the impact absorbing member 30 according to the invention and that of the impact absorbing member 100 in the comparative example. More specifically, in FIG. 14, the ordinate axis represents a load W that is applied from the side airbag 50 to the ilium upper portion 62a of the hip 62 and the lower abdomen 64 of the occupant 60 in the event of a side collision, and the abscissa axis represents a stroke S of the bumper 70 of the other vehicle with respect to the center of the hip 62 of the occupant 60 (the stroke S corresponds to the distance between the bumper 70 of the other vehicle and the center of the hip 62 of the occupant 60).

In FIG. 14, a first curve (solid line) Fp is a curve that indicates the load-stroke characteristic of the impact absorbing member 30 according to the invention, and a second curve (dashed line) Fc is a curve that indicates the load-stroke characteristic of the impact absorbing member 100 in the comparative example. The first curve Fp has an ineffective region Fp0, a first region Fp1, a second region Fp2 and a third region Fp3. In the ineffective region Fp0, the load does not increase. In the first region Fp1, the load starts sharply increasing at the end of the ineffective region Fp0, and keeps increasing at a high first gradient. In the second region Fp2, the load starts gradually increasing at the end of the first region Fp1, and keeps increasing to a load peak value Wpmax of the first curve at a second gradient that is lower than the first gradient. In the third region Fp3, the load starts sharply decreasing at the end of the second region Fp2, and keeps decreasing to a value of zero.

In the first region Fp1, the bumper 70 of the other vehicle deforms the impact bar 20 of the host vehicle inward in the vehicle lateral direction, and then the impact bar 20 pushes the impact absorbing member 30 and the door trim 18 inward in the vehicle lateral direction. In the first region Fp1, the occupant 60 is moved in a direction away from the side door 12 by the deployed side airbag 50 and the hip 62 of the occupant 60 is restrained. In the second region Fp2, the bumper 70 of the other vehicle further moves inward in the vehicle lateral direction, and the hip 62 of the occupant 60 is further pushed inward in the vehicle lateral direction by the side airbag 50 and the load W applied to the hip 62 of the occupant 60 increases. In the second region Fp2, on the other hand, a reaction force (the magnitude of the reaction force is the same as the load W and the direction of the reaction force is opposite to the load W), which is applied to the impact absorbing member 30 from the occupant 60 via the side airbag 50 and the door trim 18, also increases. At the midpoint of the second region Fp2, a crack is generated in the first portion 32 of the impact absorbing member 30, and the breaking of the first portion 32 is almost completed in a region near the load peak value Wpmax in the second region Fp2. In the third region Fp3, the stroke S of the bumper 70 is almost maximized, and the load W that is applied to the hip 62 of the occupant 60 decreases. Therefore, at the latter-half stage of the third region Fp3, the occupant 60 is moved away from the bumper 70 due to inertia, and the bumper stroke S with respect to the occupant 60 is decreased slightly.

Similarly, the second curve Fe has an ineffective region Fc0, a first region Fc1, a second region Fc2 and a third region Fc3. In the ineffective region Fc0, the load does not increase. In the first region Fc1, the load starts sharply increasing at the end of the ineffective region Fc0, and keeps increasing at a high first gradient. In the second region Fc2, the load starts gradually increasing at the end of the first region Fc1, and keeps increasing to a load peak value Wcmax of the second curve at a second gradient that is lower than the first gradient. In the third region Fc3, the load starts sharply decreasing at the end of the second region Fc2, and keeps decreasing to a value of zero.

The first curve Fp has an intersection P, at which the first curve Fp intersects with the second curve Fe, in the second region Fp2. The thickness of the first portion 32 at least at the connection portion 32a, the height of the first portion 32 in the vehicle height direction, and the amount by which the projection 40 projects from the second portion 34 in the vehicle lateral direction are set such that the intersection P is located at the middle portion of the second region Fp2 of the first curve Fp. The middle portion of the second region Fp2 is a region of ±40% of a load increase amount Winc with respect to a center Wcen, which is the center of the load increase amount Winc, in the second region Fp2. The middle portion of the second region Fp2 may be a region of ±25% of the load increase amount Winc with respect to the center Wcen. However, the middle portion is not limited to this region. The reason why the middle portion of the second region Fp2 is set to a region of ±40% or ±25% of the load increase amount Winc with respect to the center Wcen, is because an amount of energy absorbed by the impact absorbing member 30 according to the invention should be substantially the same as an amount of energy absorbed by the impact absorbing member 100 in the comparative example, as will be described later. In a region where the load W is lower than the load W at the intersection P, even if the same load is applied to the impact absorbing member 30 and the impact absorbing member 100 in the comparative example, the stroke S indicated by the first curve Fp is a smaller than the stroke S indicated by the second curve Fc. That is, in the region where the load W is lower than the load W at the intersection P, at the same stroke S, the load W indicated by the first curve Fp is higher than the load W indicated by the second curve Fc. In a region where the load W is higher than the load W at the intersection P but is lower than or equal to the load peak value Wpmax of the first curve Fp, at the same stroke S, the load W indicated by the first curve Fp is lower than the load W indicated by the second curve Fe.

The intersection P may be set by taking into account a curvature radius R1 of a curved portion 42 (portion E in FIG. 7) that extends from the first portion 32 to the second portion 34, and a curvature radius R2 of a curved portion 44 (portion F in FIG. 8) that extends from the first portion 32 to the bottom of the front slit 36 or to the bottom of the rear slit 38, in addition to the thickness of the first portion 32, the height of the first portion 32, and the projection amount of the projection 40. The smaller the curvature radius R1 and the curvature radius R2 are, the more easily the first portion 32 is broken away from the second portion 34.

The thickness of the first portion 32 at least at the connection portion 32a, the height of the first portion 32 in the vehicle height direction, and the amount by which the projection 40 projects from the second portion 34 in the vehicle lateral direction are set such that the intersection P is located at the middle portion of the second region Fp2. With this configuration, an increase amount Einc by which the energy absorption amount of the impact absorbing member 30 is increased from the energy absorption amount of the impact absorbing member 100 in the comparative example is substantially equal to a decrease amount Edec by which the energy absorption amount of the impact absorbing member 30 is decreased from the energy absorption amount of the impact absorbing member 100 in the comparative example. The increase amount Einc by which the energy absorption amount of the impact absorbing member 30 is increased from the energy absorption amount of the impact absorbing member 100 in the comparative example is indicated by an area between the first curve Fp and the second curve Fc in the region where the stroke S is smaller than the stroke S at the intersection P. The decrease amount Edec by which the energy absorption amount of the impact absorbing member 30 is decreased from the energy absorption amount of the impact absorbing member 100 in the comparative example is indicated by an area between the second curve Fc and the first curve Fp in the region in which the stroke S is larger than the stroke S at the intersection P and which extends to a point Pa at which the first curve Fp intersects with the second curve Fe again. A total amount of the energy absorbed by the impact absorbing member 30 according to the embodiment of the invention is not smaller than a total amount of the energy absorbed by the impact absorbing member 100 in the comparative example. Therefore, the impact absorbing member 30 of the invention is able to protect the occupant from an impact without increasing an impact that is given to the occupant as compared to the impact absorbing member 100 of the comparative example.

Because the impact absorbing member 30 has the projection 40, as shown in FIG. 19, the first region Fp1 of the first curve Fp is offset from the first region Fc1 of the second curve Fc by a projection amount X of the projection 40 such that the stroke S in the first region Fp1 is smaller than the stroke S in the first region Fc1. Moreover, because the impact absorbing member 30 has the first portion 32 that has the connection portion 32a with a thickness less than that of the second portion 34, the load peak value Wpmax of the first curve Fp is lower than the load peak value Wemax of the second curve Fe. The configurations described above are applied to both the first and second embodiments of the invention.

The side impact absorbing apparatus 10 according to the first embodiment of the invention further has the following configuration. As shown in FIG. 5 to FIG. 8, the front slit 36 and the rear slit 38 formed in the impact absorbing member 30 have substantially the same depth and width. The upper end of the first portion 32 is located at a position above the upper end of the second portion 34. The projection 40 is formed at a front portion of the second portion 34 of the impact absorbing member 30 in the vehicle longitudinal direction. In addition, the projection 40 is apart from the first portion 32 in the vehicle longitudinal direction. The inner face (vehicle compartment-side face) of the first portion 32 and the inner face (vehicle compartment-side face) of the second portion 34 are flush with each other. The outer face (outer side face in the vehicle lateral direction) of the second portion 34 is located outward of the outer face (outer side face in the vehicle lateral direction) of the first portion 32 in the vehicle lateral direction. The outer face (outer side face in the vehicle lateral direction) of the projection 40 is located outward of the outer face (outer side face in the vehicle lateral direction) of the second portion 34 in the vehicle lateral direction.

The side impact absorbing apparatus 10 according to the first embodiment of the invention has the following operations and advantageous effects. The operations and advantageous effects obtained due to formation of the first portion 32 in the side impact absorbing apparatus 10 are as follows. As shown in FIG. 1 and FIG. 2, when a side collision of the host vehicle with another vehicle occurs, the side airbag 50 is deployed between the side portion of the occupant 60 and the door trim 18. The side airbag 50 is deployed throughout a region from the shoulder or the chest of the occupant 60 to a position immediately above the upper face of the side portion of a seat cushion. The deployment and inflation of the side airbag 50 are completed before the door trim 18 deforms toward the lateral center of the vehicle compartment.

Figure 3:
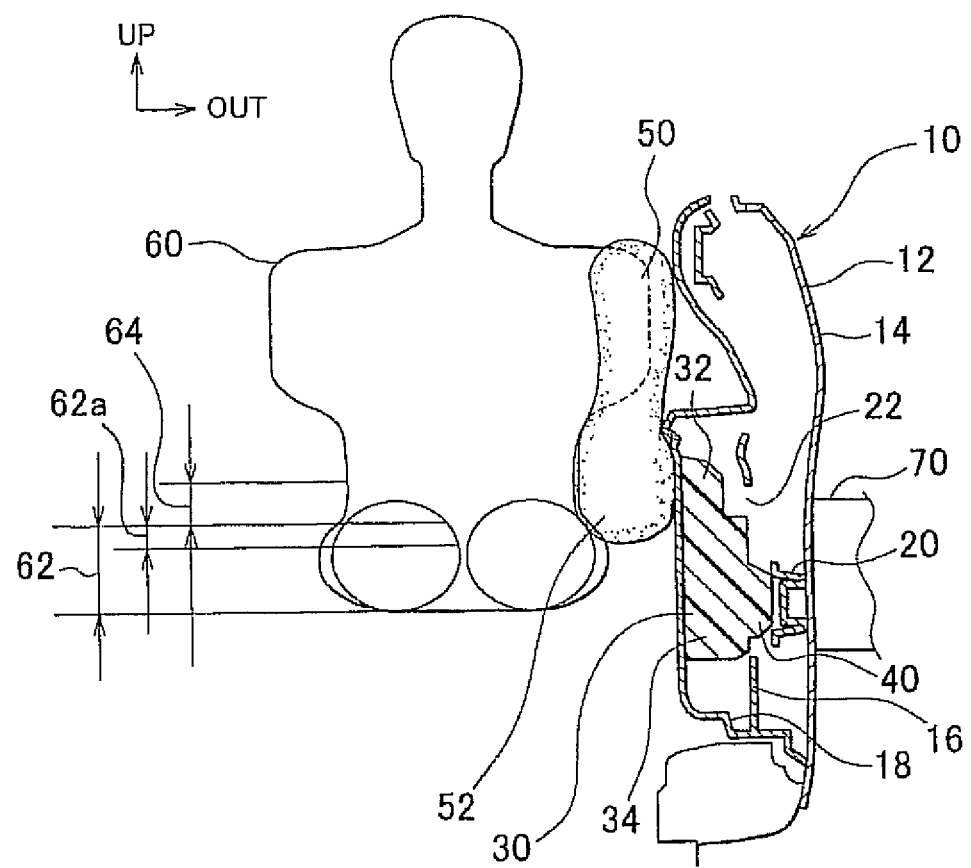
FIG. 3 is a sectional view corresponding to FIG. 2, showing the state after the bumper of the other vehicle collides with the side door but before a first portion breaks.

Subsequently, as shown in FIG. 3, the bumper 70 of the other vehicle hits the outer panel 19 of the side door 12 and deforms the outer panel 14 toward the vehicle compartment, and then the bumper 70 collides with the impact bar 20 via the outer panel 14 and deforms the impact bar 20 toward the vehicle compartment. When the bumper 70 of the other vehicle further moves toward the vehicle compartment of the host vehicle, a load is applied to the door trim 18 via the impact absorbing member 30 provided on the back side of the door trim 18 and the door trim 18 is pushed toward the lateral center of the vehicle compartment. A load is applied from the door trim 18 into the lower portion 52 of the side airbag 60 deployed on the side of the hip 62 and the lower abdomen 64 of the occupant 60, and thus the hip 62 of the occupant 60 is restrained. The state where restraint of hip 62 is completed corresponds to the peak of the first curve Fp in the first region Fp1 in FIG. 4.

When the bumper 70 of the other vehicle further moves toward the lateral center of the vehicle compartment and the stroke S of the bumper 70 with respect to the hip 62 of the occupant 60 is increased, a load that is applied to the hip 62 of the occupant 60 is further increased and a load that is applied, as a reaction force, from the side airbag 50 to the first portion 32 of the impact absorbing member 30 via the door trim 18 is increased. Then, as shown in FIG. 4, the first portion 32 is deformed greatly outward in the vehicle lateral direction with respect to the second portion 34 that is located below the first portion 32, and the first portion 32 finally breaks. This will be described with reference to FIG. 14. The load W applied to the hip 62 of the occupant 60 increases within the second region Fp2 of the first curve Fp up to the load peak value Wpmax. During this period, the side airbag 50 applies a reaction force from the hip 62 and the lower abdomen 64 of the occupant 60 to the impact absorbing member 30 via the door trim 18. The first portion 32 is smaller in thickness, at least at the connection portion 32a, than the portion 34a of the second portion 34, which is located immediately below the connection portion 32a. Therefore, as the reaction force applied from the side airbag 50 to the first portion 32 increases with an inward movement of the bumper 70, the first portion 32 is deformed so as to topple outward in the vehicle lateral direction with respect to the second portion 34. Then, as the reaction force applied to the first portion 32 further increases, a crack is generated and develops in the connection portion 32a, and finally the connection portion 32a is broken away from the second portion 34. In FIG. 14, a crack is generated in the region where the stroke S is smaller than the stroke S at the intersection P, and the breaking of the first portion 32 is completed near the load peak value Wpmax. When the first portion 32 is deformed or broken outward in the vehicle lateral direction, a portion of the door trim 18, which is located inward of the first portion 32 in the vehicle lateral direction, is deflected outward in the vehicle lateral direction. The deflection of the portion of the door trim 18 reduces a load that is applied to the ilium upper portion 62a and the lower abdomen 64 of the occupant 60. As shown in FIG. 14, the load that is applied to the occupant 60 is reduced by an amount corresponding to the difference between the load peak value Wcmax and the load peak value Wpmax. As a result, damage to the occupant 60 is reduced.

When the first portion 32 is set to a portion of the impact absorbing member 30, which is outward in the vehicle lateral direction of the ilium upper portion 62a and the lower abdomen 64 of the occupant 60 who has a small body size that corresponds to, for example, AF05 dummy, it is possible to effectively protect the small occupant 60 who is less resistant to a vehicle collision. Furthermore, only the first portion 32 is reliably broken because the front slit 36 is formed at a position forward of the first portion 32 and the rear slit 38 is formed at a position rearward of the first portion 32 in the vehicle longitudinal direction.

Operations and advantageous effects obtained by formation of the projection 40 are as follows. Because the impact absorbing member 30 has the projection 40, the clearance between the distal end of the projection 40 and the impact bar 20 is less than the clearance between the impact absorbing member 100 with no projection 40 in the comparative example and the impact bar 20. Therefore, as shown in FIG. 14, when a side collision occurs, the time at which the impact bar 20 hits the projection 40 of the impact absorbing member 30 is earlier than the time at which the impact bar 20 hits the impact absorbing member 100 with no projection 40 by an amount corresponding to the projection amount X of the projection 40. Due to this, the door trim 18 is pushed toward the lateral center of the vehicle compartment more promptly, and the hip 62 of the occupant 60 is restrained by the deployed side airbag 50 more promptly. Therefore, it is possible to more promptly restrain the hip 62 of the occupant 60 with the side air bag 50 at the early stage of a side collision.

When the projection 40 is formed in the impact absorbing member 30 at a position forward of the portion 34a of the second portion 34, which is located below the first portion 32, in the vehicle longitudinal direction, the position of the projection 40 is near the longitudinally middle portion of the impact bar 20, at which deformation of the impact bar 20 in the event of a side collision is greatest. The position of the projection 40 set in the above-described manner is effective in restraining the hip 62 of the occupant 60 promptly.

Operations and advantageous effects obtained by setting the intersection P at the middle portion of the second region Fp2 of the first curve Fp are as follows. As shown in the graph in FIG. 14, the intersection P of the first curve Fp with the second curve Fc is set in the middle portion of the second region Fp2 of the first curve Fp. Therefore, the increase amount Einc by which the energy absorption amount of the impact absorbing member 30 is increased from the energy abruption amount of the impact absorbing member in the comparative example is substantially the same as the decrease amount Edec by which the energy absorption amount of the impact absorbing member 30 is decreased from the energy abruption amount of the impact absorbing member in the comparative example. Thus, it is possible to maintain the energy absorption effect produced by the impact absorbing member 30 at substantially the same level as the energy absorption effect produced by the impact absorbing member 100 in the comparative example. Therefore, while maintaining the energy absorption effect produced by the impact absorbing member 30 at substantially the same level as the energy absorption effect produced by the impact absorbing member 100 in the comparative example, it is possible to more promptly restrain the hip 62 of the occupant 60 due to formation of the projection 40, and it is possible to reduce a load that is applied to the hip 62 and the lower abdomen 64 of the occupant 60 due to formation of the first portion 32. The above-described operations and advantageous effects are obtained in both the first and second embodiments.

Further, the following operations and advantageous effects are obtained in the first embodiment of the invention. The front slit 36 and the rear slit 38, which are located forward of and rearward of the first portion 32 in the vehicle longitudinal direction, respectively, extend only to the positions near the lower end of the first portion 32. The width of the front slit 36 and the width of the rear slit 38 are substantially the same, and the width of the front slit 36 is less than that in the second embodiment, which will be described below. Because the depth and the width of the front slit 36 are set as described above, an area within the second portion 34, in which the projection 40 may be formed, is increased and the flexibility in selecting the position of the projection 40 is also increased.

Next, the side impact absorbing apparatus 10 according to the second embodiment of the invention will be described. The side impact absorbing apparatus 10 according to the second embodiment of the invention further have the following configurations, operations and advantageous effects, in addition to the configurations, operations and advantageous effects that have been described in the first embodiment as being applied also in the second embodiment.

As shown in FIG. 9 to FIG. 11, in the configuration of the side impact absorbing apparatus 10 according to the second embodiment of the invention, among the front slit 36 and the rear slit 38, which are located forward of and rearward of the first portion 32, respectively, in the vehicle longitudinal direction, the front slit 36 is larger in width in the vehicle longitudinal direction than the rear slit 38. When the vehicle spins and obliquely collides with a standstill pole, the front slit 36 serves as a space for suppressing application of a load from the pole to the occupant who is moved forward. A portion of the impact absorbing member 30, which is located forward of the slit 36, is included in the second portion 34, and the portion extends upward beyond the upper end of the first portion 32. The projection 40 is formed in the second portion 34 at a portion located forward of the front slit 36. The upper end of the projection 40 is located above the bottom of the front slit 36, and the lower end of the projection 40 is located below the bottom of the front slit 36.

The side impact absorbing apparatus 10 according to the second embodiment of the invention has the following operations and advantageous effects. Because the front slit 36, which is located forward of the first portion 32, is larger in width and depth than the rear slit 38, it is possible to suppress application of a load from a pole to the occupant who is moved forward on the seat when the vehicle collides with the pole.

While the invention has been described with reference to example embodiments thereof, it is to be understood that the invention is not limited to the described example embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A side impact absorbing apparatus for a vehicle, comprising:
an impact bar that is disposed inside a side door so as to extend along an outer panel of the side door;
an impact absorbing member that is located outward of a hip and a lower abdomen of an occupant in a vehicle lateral direction, the impact absorbing member disposed on a back side of a door trim of the side door, and the impact absorbing member has a portion which overlaps the impact bar when seen from a side of a host vehicle; and
a side airbag that is deployed and inflated between the door trim and a side portion of the occupant when a side collision occurs,
wherein the impact absorbing member has i) a first portion which overlaps a lower portion of the deployed side airbag when seen from the side of the host vehicle, and to which a load from the deployed side airbag is applied, and ii) a second portion that is a portion of the impact absorbing member other than the first portion,
wherein the first portion has a connection portion that is connected to the second portion, and
wherein the first portion is smaller in thickness at least at the connection portion that is connected to the second portion than a portion of the second portion, the portion being connected to the first portion from below the first portion.

2. The side impact absorbing apparatus according to claim 1, wherein:
the impact absorbing member has a projection at least at a part of the portion of the impact absorbing member, the portion overlapping the impact bar when seen from the side of the host vehicle; and
the projection is fitted in a hole formed in an inner panel and projects toward the impact bar.

3. The side impact absorbing apparatus according to claim 1, wherein the first portion of the impact absorbing member is formed at a portion of the impact absorbing member, the portion being located outward of an ilium upper portion and a lower abdomen of a seated small occupant in the vehicle lateral direction.

4. The side impact absorbing apparatus according to claim 3, wherein a body size of the seated small occupant is a body size that corresponds to AF05 dummy.

5. The side impact absorbing apparatus according to claim 1, wherein:
the impact absorbing member has a front slit and a rear slit which are formed at a position forward of the first portion and a position rearward of the first portion, respectively, in a vehicle longitudinal direction, and each of which extends from an upper end of the impact absorbing member to a position corresponding to a lower end of the first portion or to a position below the lower end of the first portion when seen from the side of the host vehicle; and
the first portion is smaller in thickness at least at the connection portion than the portion of the second portion, the portion being connected to the first portion from below the first portion, over a whole length between the front slit and the rear slit in the vehicle longitudinal direction.

6. The side impact absorbing apparatus according to claim 2, wherein the projection is formed at a position forward of the first portion of the impact absorbing member in a vehicle longitudinal direction.

7. The side impact absorbing apparatus according to claim 2, wherein:
on a graph in which an ordinate axis represents a load that is applied from the side airbag to the first portion and an abscissa axis represents a stroke of a bumper of another vehicle with respect to the hip of the occupant, a first curve indicates a load-stroke characteristic of the impact absorbing member that has the projection and the first portion and a second curve indicates a load-stroke characteristic of an impact absorbing member that has neither the projection nor the first portion; and
a thickness of the first portion at least at the connection portion, a height of the first portion, and an amount by which the projection projects from the second portion in the vehicle lateral direction are set such that conditions i) to v) are satisfied:
i) the first curve has a first region in which the load increases at a first gradient, and a second region in which the load increases up to a load peak value at a second gradient that is lower than the first gradient,
ii) the first curve has an intersection at which the first curve intersects with the second curve in the second region,
iii) the intersection is located in a middle portion of the second region of the first curve,
iv) in a region in which the load is lower than the load at the intersection, when the same load is applied to each of the impact absorbing members, the stroke indicated by the first curve is smaller than the stroke indicated by the second curve, and
v) in a region in which the load is higher than the load at the intersection and which extends up to the load peak value of the first curve, at the same stroke, the load indicated by the first curve is lower than the load indicated by the second curve.

8. The side impact absorbing apparatus according to claim 5, wherein:
a width of the front slit in the vehicle longitudinal direction is larger than a width of the rear slit in the vehicle longitudinal direction; and
the front slit serves as a space for suppressing application of a load from a pole to the occupant when a collision between the host vehicle and the pole occurs.

9. The side impact absorbing apparatus according to claim 5, wherein the front slit and the rear slit extend to positions near the lower end of the first portion.

10. The side impact absorbing apparatus according to claim 5, wherein a width of the front slit in the vehicle longitudinal direction is substantially the same as a width of the rear slit in the vehicle longitudinal direction.

* * * * *